US012612114B2

(12) United States Patent
An et al.

(10) Patent No.: US 12,612,114 B2
(45) Date of Patent: Apr. 28, 2026

(54) FLOOR STRUCTURE FOR ELECTRIC VEHICLE

(71) Applicants: Hyundai Motor Company, Seoul (KR); Kia Corporation, Seoul (KR)

(72) Inventors: Byeongdo An, Anyang-si (KR); Yong Dok An, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 442 days.

(21) Appl. No.: 18/302,983

(22) Filed: Apr. 19, 2023

(65) Prior Publication Data

US 2024/0051611 A1    Feb. 15, 2024

(30) Foreign Application Priority Data

Aug. 12, 2022    (KR) ........................ 10-2022-0101373

(51) Int. Cl.
  *B62D 25/20*       (2006.01)
  *B60K 1/04*        (2019.01)
  *B60N 2/015*       (2006.01)

(52) U.S. Cl.
  CPC ............ *B62D 25/2036* (2013.01); *B60K 1/04* (2013.01); *B60N 2/015* (2013.01); *B60K 2001/0438* (2013.01)

(58) Field of Classification Search
  CPC .. B62D 25/025; B62D 25/20; B62D 25/2036; B60K 1/04; B60K 2001/0438; B60N 2/015
  See application file for complete search history.

(56) References Cited

U.S. PATENT DOCUMENTS

| | | | | |
|---|---|---|---|---|
| 8,939,246 B2 * | 1/2015 | Yamaguchi | ............. | B60L 50/66 180/311 |
| 2009/0134668 A1 * | 5/2009 | Oezkan | .................. | B62D 25/20 296/193.07 |
| 2009/0278385 A1 * | 11/2009 | Mendoza | ............... | B62D 25/20 296/204 |
| 2010/0237659 A1 * | 9/2010 | Ishigame | ............. | B62D 21/157 296/204 |
| 2012/0049501 A1 * | 3/2012 | Fujii | ..................... | B60R 22/195 280/806 |
| 2012/0161429 A1 * | 6/2012 | Rawlinson | ........... | B62D 25/025 280/801.1 |
| 2014/0028053 A1 * | 1/2014 | Hihara | ............... | B62D 25/2036 296/187.12 |
| 2015/0001882 A1 * | 1/2015 | Saje | ....................... | B62D 21/03 296/187.12 |

(Continued)

*Primary Examiner* — Gregory A Blankenship
(74) *Attorney, Agent, or Firm* — Slater Matsil, LLP

(57) ABSTRACT

An embodiment floor structure for an electric vehicle includes a cross member connected to an upper portion of a floor panel of the electric vehicle along a vehicle width direction, wherein the floor panel is configured to be connected to a pair of side sills that are disposed on each side of the electric vehicle, respectively, and extend in a front-to-rear direction of the electric vehicle, and a seat mounting unit installed on the cross member, wherein the seat mounting unit comprises a lower mounting bracket connected to an upper portion of the cross member and an upper mounting bracket connected to an upper portion of the lower mounting bracket.

20 Claims, 12 Drawing Sheets

(56) References Cited

U.S. PATENT DOCUMENTS

| | | | |
|---|---|---|---|
| 2015/0375808 A1* | 12/2015 | Ganti | B62D 25/20 |
| | | | 296/193.07 |
| 2017/0015360 A1* | 1/2017 | Onishi | B62D 21/157 |
| 2018/0194212 A1* | 7/2018 | Hamilton | B60N 2/015 |
| 2018/0215245 A1* | 8/2018 | Sudhindra | B60L 50/64 |
| 2019/0210659 A1* | 7/2019 | Choi | B60K 1/04 |
| 2019/0359048 A1* | 11/2019 | Tsuyuzaki | B60K 1/04 |
| 2020/0114972 A1* | 4/2020 | Lee | B60K 1/04 |
| 2020/0282816 A1* | 9/2020 | Matsuda | B62D 25/025 |
| 2021/0070375 A1* | 3/2021 | Ebisumoto | B60N 2/015 |
| 2021/0170915 A1* | 6/2021 | Park | B62D 25/2036 |
| 2021/0179197 A1* | 6/2021 | Kim | B62D 27/02 |
| 2021/0245810 A1* | 8/2021 | Walker | B62D 21/15 |
| 2022/0161867 A1* | 5/2022 | Choi | B62D 25/2036 |
| 2022/0176787 A1* | 6/2022 | Ostertag | B62D 25/20 |
| 2024/0051611 A1* | 2/2024 | An | B60K 1/04 |
| 2024/0051612 A1* | 2/2024 | An | B62D 21/157 |
| 2024/0198863 A1* | 6/2024 | Hirota | B62D 25/2036 |
| 2024/0336164 A1* | 10/2024 | Jeong | B60R 16/04 |
| 2024/0359747 A1* | 10/2024 | Kang | B62D 25/2036 |
| 2024/0383533 A1* | 11/2024 | Shin | B62D 25/2036 |
| 2025/0153776 A1* | 5/2025 | Kang | B62D 25/2036 |
| 2025/0229844 A1* | 7/2025 | Mika | B62D 25/2036 |

* cited by examiner

100

100

FLOOR STRUCTURE FOR ELECTRIC VEHICLE

CROSS-REFERENCE TO RELATED APPLICATIONS

This application claims the benefit of Korean Patent Application No. 10-2022-0101373, filed on Aug. 12, 2022, which application is hereby incorporated herein by reference.

TECHNICAL FIELD

The present invention relates to a vehicle body structure for an electric vehicle.

BACKGROUND

Due to recently strengthened environmental regulations and fuel efficiency regulations, the use of an electric vehicle driven by an electric driving source is increasing.

An electric vehicle is equipped with a battery assembly that supplies electricity to an electric drive source. The battery assembly is mounted on the lower part of the center floor structure in the vehicle body of an electric vehicle, for example.

In order to increase the capacity of the battery assembly while securing a wide indoor space, a flat type center floor structure in which the tunnel portion is omitted and the height of the cross-section is reduced is applied to such an electric vehicle.

However, the flat type center floor structure is disadvantageous in terms of rigidity due to an increase in parts of an electric driving source, an increase in a wheel base, and mounting of a seat and a battery assembly, and may cause excessive vibration.

Furthermore, such a center floor structure may cause damage to the battery assembly and damage to the occupant due to rotational deformation of the side sill as the crash load is concentrated on the side of the side sill during a side collision.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body structure for an electric vehicle. Particular embodiments relate to a floor structure for an electric vehicle to mount a seat and battery assembly.

Embodiments of the present invention provide a floor structure for an electric vehicle capable of securing coupling rigidity between a seat and a battery assembly, minimizing vibration of the seat, reinforcing rigidity of a vehicle body, and improving side impact performance.

A floor structure for an electric vehicle including a floor panel connected to side sills disposed on each side along the vehicle width direction along the front and rear directions of the vehicle body is provided. The floor structure according to an exemplary embodiment of the present invention may include at least one cross member connected to an upper portion of the floor panel along a vehicle width direction and a plurality of seat mounting units installed on the at least one cross member, wherein the seat mounting unit of at least one of the plurality of seat mounting units may include a lower mounting bracket connected to an upper portion of the at least one cross member and an upper mounting bracket connected to an upper portion of the lower mounting bracket.

The at least one seat mounting unit may further include a seat mounting pipe nut disposed between the lower mounting bracket and the upper mounting bracket and connected to the lower mounting bracket and the upper mounting bracket.

The at least one seat mounting unit may further include a battery mounting pipe nut connected to the lower surface of the lower mounting bracket for mounting a battery assembly disposed on the lower part of the floor panel.

The lower mounting bracket may include a plurality of first joint flanges formed on the edge portion to be connected to the upper surface of the at least one cross member and a first protrude portion that extends upward from the upper surface and is disposed along the front and rear direction of the vehicle body in a form in which the height thereof gradually increases from the rear portion to the front portion of the vehicle body.

The upper mounting bracket may include a plurality of second joint flanges formed on an edge portion to be connected to an upper surface of the lower mounting bracket and an upper surface of the at least one cross member and a second protrude portion that extends upward from the upper surface and is disposed along the front and rear direction of the vehicle body in a form in which the height thereof gradually increases from the rear portion to the front portion of the vehicle body.

The upper mounting bracket may further include at least one third joint flange portion connected to the sill inner member of each side sill.

The seat mounting pipe nut may be disposed on the upper side of the battery mounting pipe nut.

The seat mounting pipe nut may be connected to the upper surface of the lower mounting bracket and to the lower surface of the upper mounting bracket, and the seat mounting pipe nut may be connected to first engage holes formed to the lower mounting bracket and the upper mounting bracket, respectively.

The seat engage bolt may be engaged to the seat mounting pipe nut through the first engage hole.

The battery mounting pipe nut may be connected to second engage holes formed to the lower mounting bracket and the upper mounting bracket, respectively.

A battery engage bolt may be engaged to the battery mounting pipe nut through the second engage holes.

The floor structure for an electric vehicle according to an exemplary embodiment of the present invention may further include a reinforcement member disposed inside each side sill along the front and rear directions of the vehicle body and made of an aluminum extruded material.

A battery assembly may be disposed on the lower part of the floor panel, and the battery assembly may be connected to the lower portions of the reinforcement member and the sill inner members through a battery mounting unit.

The battery mounting unit may include a bolt support portion formed on a side flange portion provided on both sides of the battery assembly along the vehicle width direction, a support bracket connected to an inner surface of a lower portion of the sill inner member and engaged to a lower portion of the reinforcement member, a nut member secured to the support bracket and connected to the bolt support portion, and a mounting bolt engaged to the nut member through the bolt support portion.

According to an exemplary embodiment of the present invention, it is possible to minimize the generation of vibration of the seat while driving the electric vehicle, to reinforce the rigidity of the vehicle body, and to improve the side impact performance of the electric vehicle.

In addition, effects that can be obtained or predicted by the embodiments of the present invention will be directly or implicitly disclosed in the detailed description of the embodiments of the present invention. That is, various effects expected according to exemplary embodiments of the present invention will be disclosed within the detailed description to be described later.

BRIEF DESCRIPTION OF THE DRAWINGS

A better understanding will be obtained with reference to the following description in conjunction with the accompanying drawings in which like reference numbers in the preferred embodiments of the present specification refer to the same or functionally similar elements.

Figure 1:
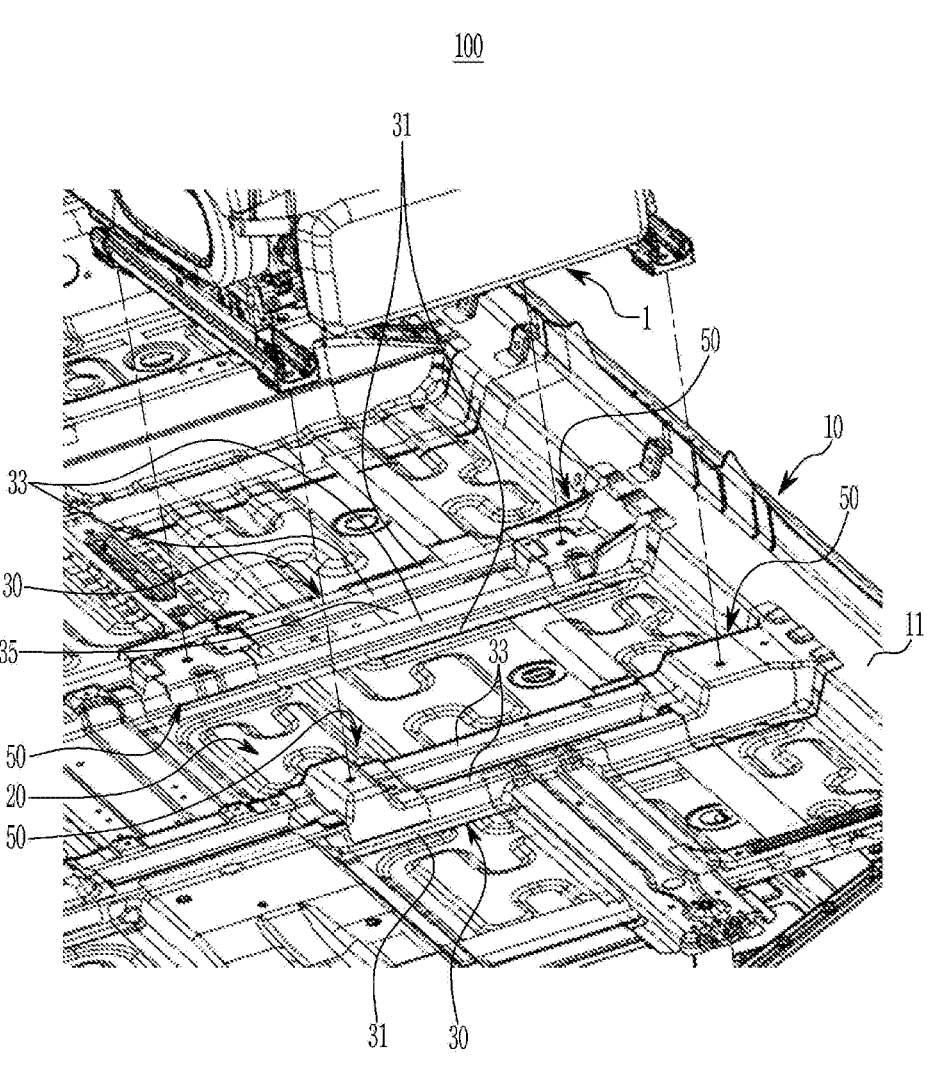
FIG. 1 is a partial exploded perspective view of a floor structure for an electric vehicle according to an exemplary embodiment of the present invention viewed from the top.

It should be understood that the drawings referenced above are not necessarily drawn to scale and present rather simplified representations of various preferred features illustrating the basic principles of embodiments of the present invention. Certain design features of embodiments of the present invention, including, for example, particular dimensions, orientations, locations, and shapes, will be determined in part by the particular intended application and use environment.

The following reference identifiers may be used in connection with the accompanying drawings to describe exemplary embodiments of the present disclosure.

| | |
|---|---|
| 1: seat | 3: battery assembly |
| 5: side flange portion | 10: side sill |

4

-continued

| | |
|---|---|
| 11: sill inner member | 13: sill outer member |
| 20: floor panel | 30: seat cross member |
| 31: connection portion | 33: forming portion |
| 35: recess portion | 39: penetration hole |
| 50: seat mounting unit | 51: lower mounting bracket |
| 53: first joint flange portion | 55: first protrude portion |
| 59a, 69a: first engage hole | 59b, 69b: second engage hole |
| 61: upper mounting bracket | 63: second joint flange portion |
| 65: second protrude portion | 67: third joint flange portion |
| 71: seat mounting pipe nut | 73: seat engage bolt |
| 75: battery mounting pipe nut | |
| 77: battery engage bolt | |
| 80: reinforcement member | 81: partition |
| 83: closed section | 90: battery mounting unit |
| 91: bolt support member | 93: support bracket |
| 95: nut member | 97: mounting bolt |
| 99: screw | |
| 100: floor structure for an electric vehicle | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The terminology used herein is for the purpose of describing specific embodiments only and is not intended to limit the present disclosure.

As used herein, the singular forms are intended to include the plural forms as well, unless the context clearly indicates otherwise.

The terms 'comprises' and/or 'comprising' as used herein indicate the presence of specified features, integers, steps, operations, elements, and/or components, but it should also be understood that it does not exclude the presence or addition of one or more other features, integers, steps, operations, components, and/or groups thereof.

As used herein, the term 'and/or' includes any one or all combinations of one or more of the associated listed items.

In this specification, the term 'connected' indicates a physical relationship between two components, for example, in which components are directly connected to each other by welding, self piercing rivet (SPR), flow drill screw (FDS), structural adhesive, or the like, or components that are indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based purpose built vehicles (PBVs), hydrogen-powered vehicles and other alternative fuel vehicles (e.g., other than petroleum fuel derived from resources).

Hereinafter, embodiments of the present invention will be described in detail with reference to the accompanying drawings.

Figure 2:
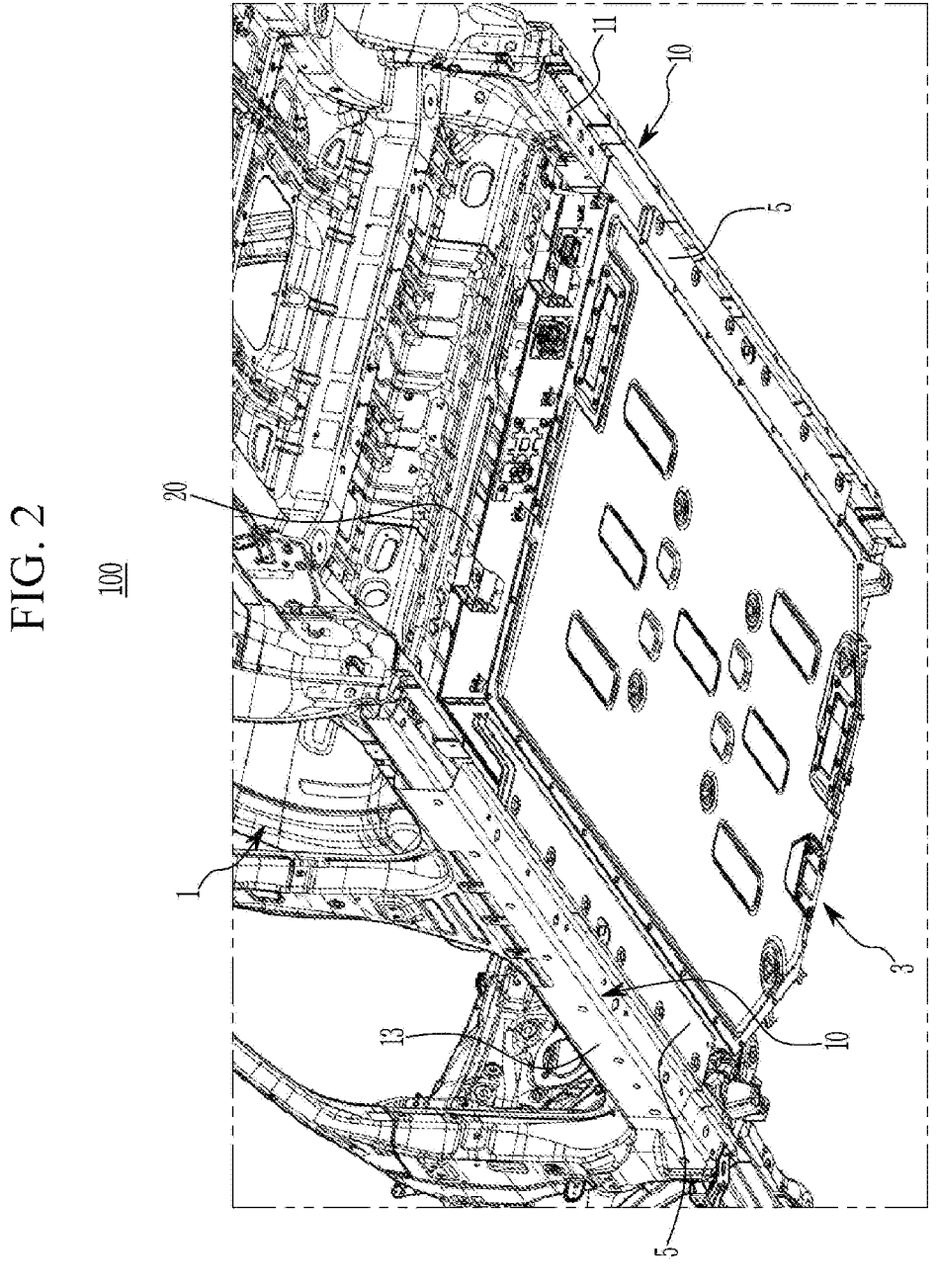
FIG. 2 is a partial perspective view of a floor structure for an electric vehicle according to an exemplary embodiment of the present invention viewed from the bottom.

FIG. 1 is a partial exploded perspective view of a floor structure for an electric vehicle according to an exemplary embodiment of the present invention viewed from the top, and FIG. 2 is a partial perspective view of a floor structure for an electric vehicle according to an exemplary embodiment of the present invention viewed from the bottom.

Referring to FIG. 1 and FIG. 2, a floor structure 100 for an electric vehicle according to an exemplary embodiment of the present invention may be applied to a body of an electric vehicle.

Furthermore, the floor structure 100 for the electric vehicle according to an exemplary embodiment of the present invention may be applied to a center floor structure in a lower vehicle body structure of an electric vehicle.

Here, at least one seat 1 may be mounted on an upper portion of the floor structure 100 for the electric vehicle according to an exemplary embodiment of the present invention.

In addition, a battery assembly 3 may be mounted on a lower portion of the floor structure 100 for the electric vehicle according to an exemplary embodiment of the present invention.

In this specification, the 'front-to-back direction of the vehicle body' may be defined as the longitudinal direction of the vehicle body, the 'vehicle width direction' may be defined as the left-right direction of the vehicle body, and the 'up-and-down direction' may be defined as the height direction of the vehicle body.

Furthermore, in this specification, 'upper end', 'upper portion', or 'upper surface' of a component indicates an end portion or surface of a component that is relatively upper in the drawing and 'lower end', ' lower portion', or ' lower surface' of a component indicates an end portion or surface of a component that is relatively lower in the drawing.

Furthermore, in this specification, an end of a component (e.g., one end or another (other) end, etc.) denotes an end of a component in any one direction, and an end portion of the component (e.g., one end portion or other (another) end portion, etc.) denotes a portion of a component that includes that end.

The floor structure 100 for the electric vehicle according to an exemplary embodiment of the present invention may secure coupling rigidity between the at least one seat 1 and the battery assembly 3 and minimize vibration of the at least one seat 1.

In addition, an exemplary embodiment of the present invention provides a floor structure 100 for an electric vehicle capable of reinforcing the bending rigidity of a vehicle body and improving side impact performance.

The floor structure 100 for the electric vehicle according to an exemplary embodiment of the present invention includes a side sill 10, a floor panel 20, at least one seat cross member 30, and a plurality of seat mounting units 50.

The side sill 10 is provided on both sides along the vehicle width direction of the floor structure 100 for the electric vehicle according to an exemplary embodiment of the present invention.

Each side sill 10 is disposed along the front-to-back direction of the vehicle body.

Each side sill 10 includes a sill inner member 11 and a sill outer member 13 of steel material connected together.

Each of the side sills 10 may include an inner space formed between the sill inner member 11 and the sill outer member 13 connected to each other along the front-to-rear direction of the vehicle body.

In an exemplary embodiment of the present invention, the floor panel 20 may be, in one example, a center floor panel.

In another example, the floor panel 20 may have a flat shape in which a tunnel portion is omitted.

The floor panel 20 is connected, for example, welded, to the sill inner member 11 of each side sill 10 through both ends along the vehicle width direction.

Both ends may be formed of a joint flange bent in an upward direction.

The at least one seat 1 may be mounted on an upper portion of the floor panel 20.

And the battery assembly 3 may be mounted on a lower portion of the floor panel 20 through each side sill 10.

Figure 3:
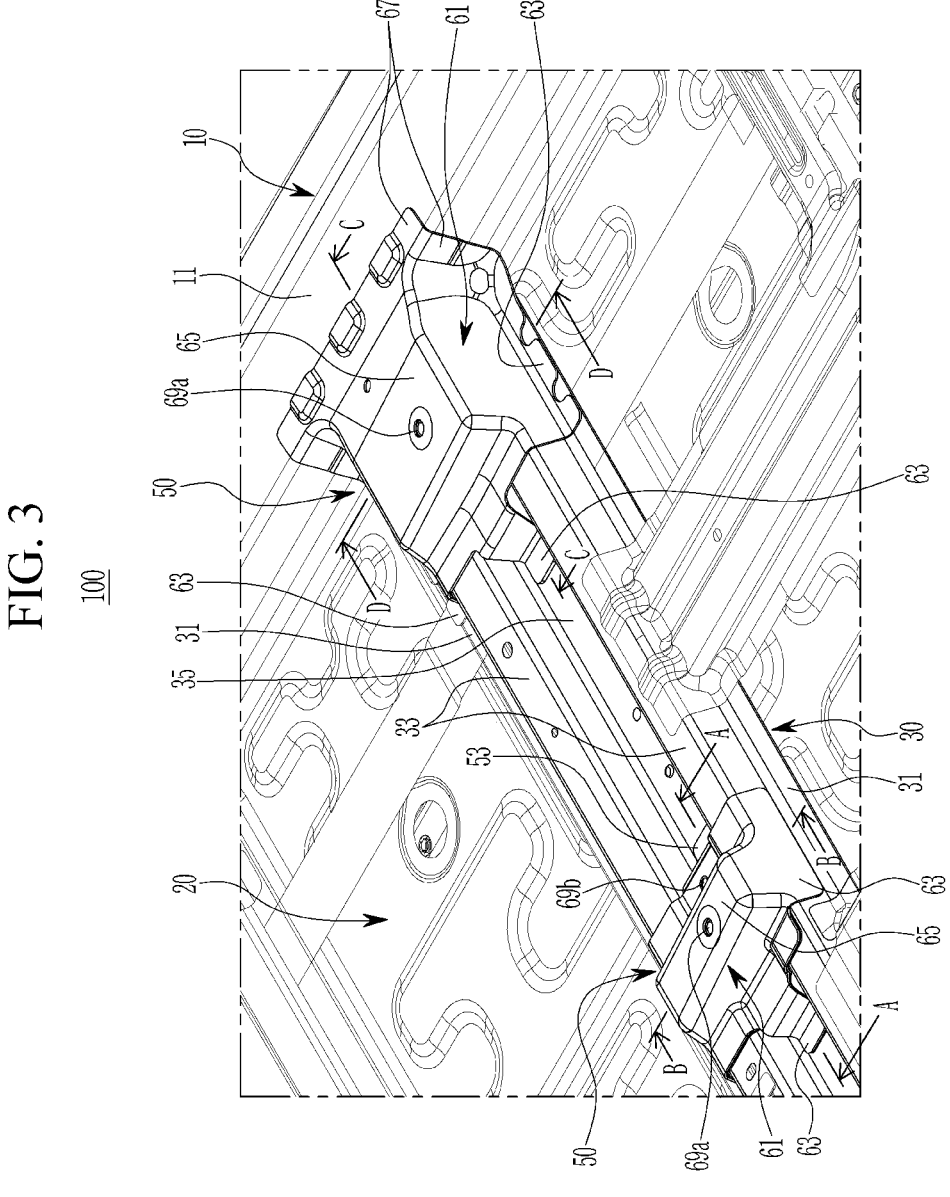
FIG. 3 is a perspective view of a seat cross member and a seat mounting unit applied to a floor structure for an electric vehicle according to an exemplary embodiment of the present invention.
Figure 4:
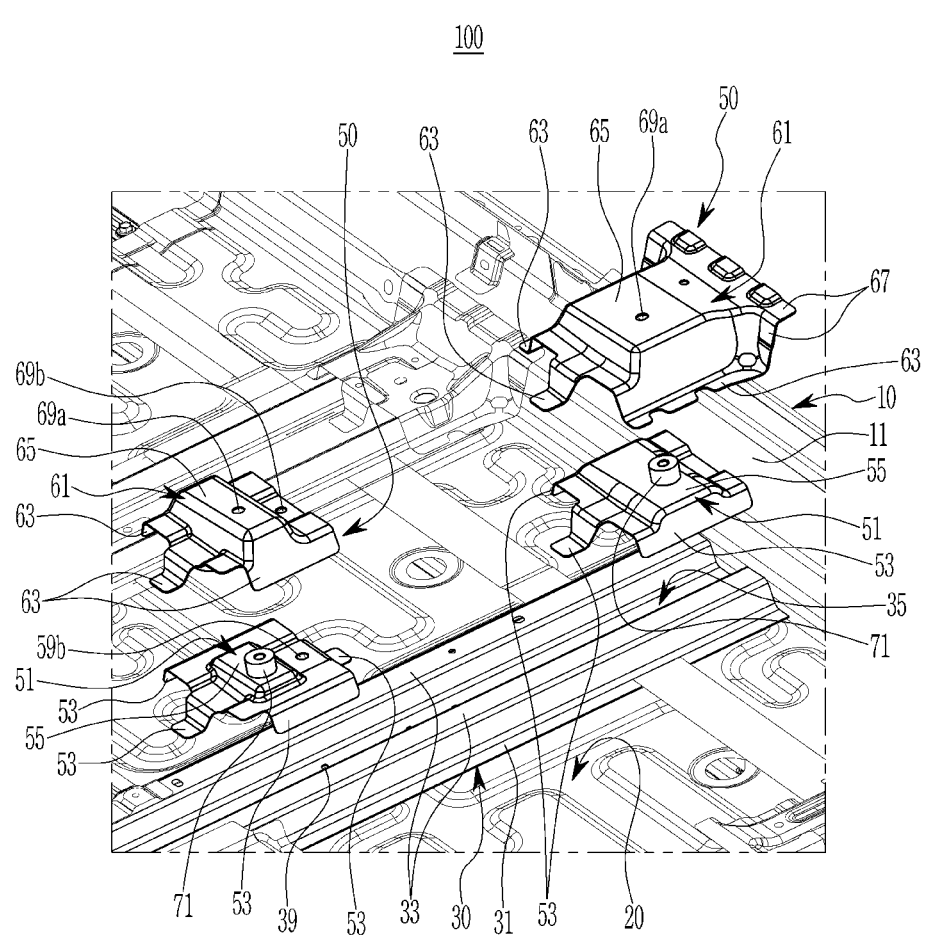
FIG. 4 and FIG. 5 are exploded perspective views of a seat cross member and a seat mounting unit applied to a floor structure for an electric vehicle according to an exemplary embodiment of the present invention.
Figure 5:
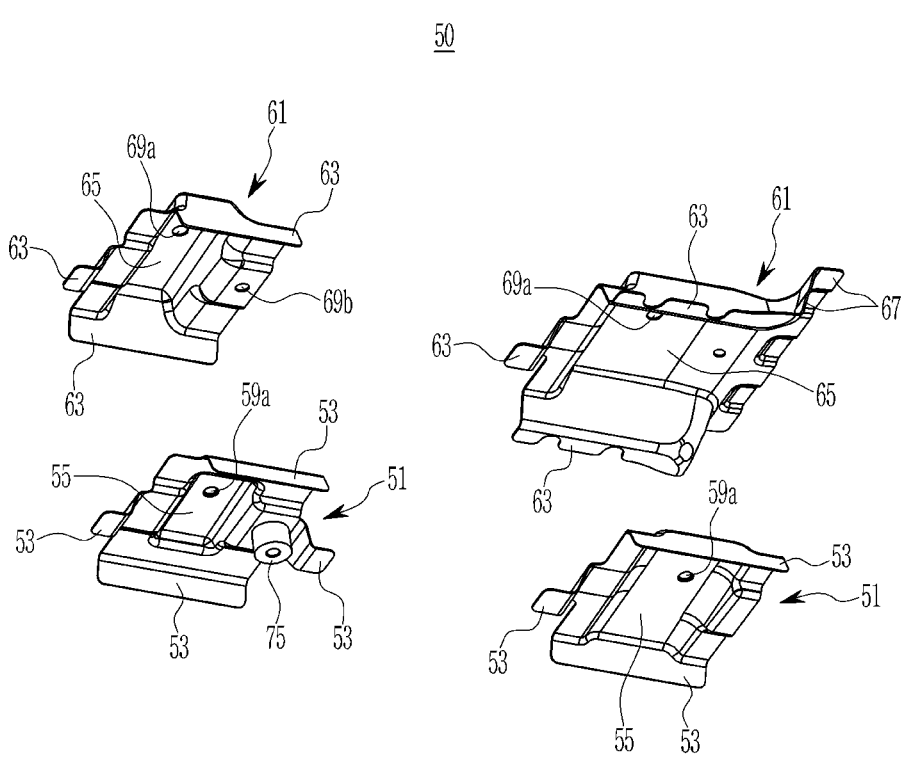

FIG. 3 is a perspective view of a seat cross member and a seat mounting unit applied to a floor structure for an electric vehicle according to an exemplary embodiment of the present invention, and FIG. 4 and FIG. 5 are exploded perspective views of a seat cross member and a seat mounting unit applied to a floor structure for an electric vehicle according to an exemplary embodiment of the present invention.

Figure 6A:
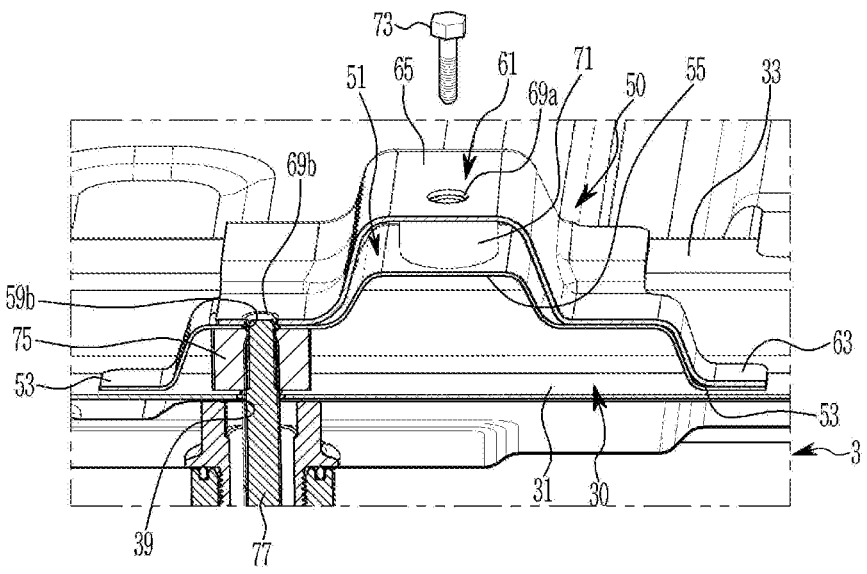
FIG. 6A and FIG. 6B are cross-sectional views along line A-A in FIG. 3.
Figure 6B:
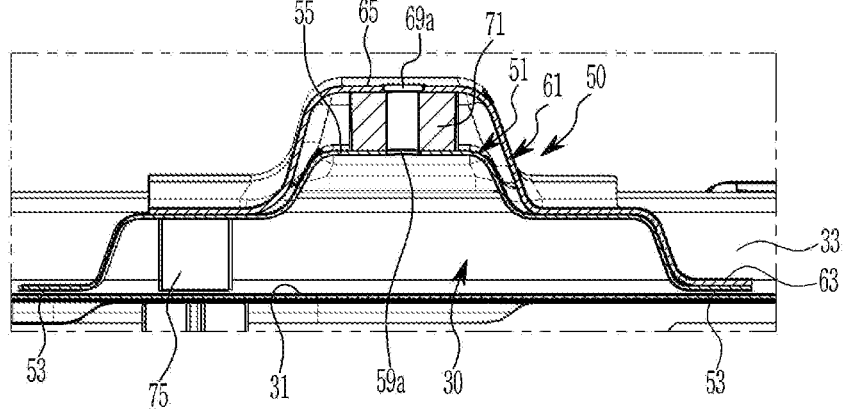

FIG. 6A and FIG. 6B are cross-sectional views along line A-A in FIG. 3.

Figure 12:
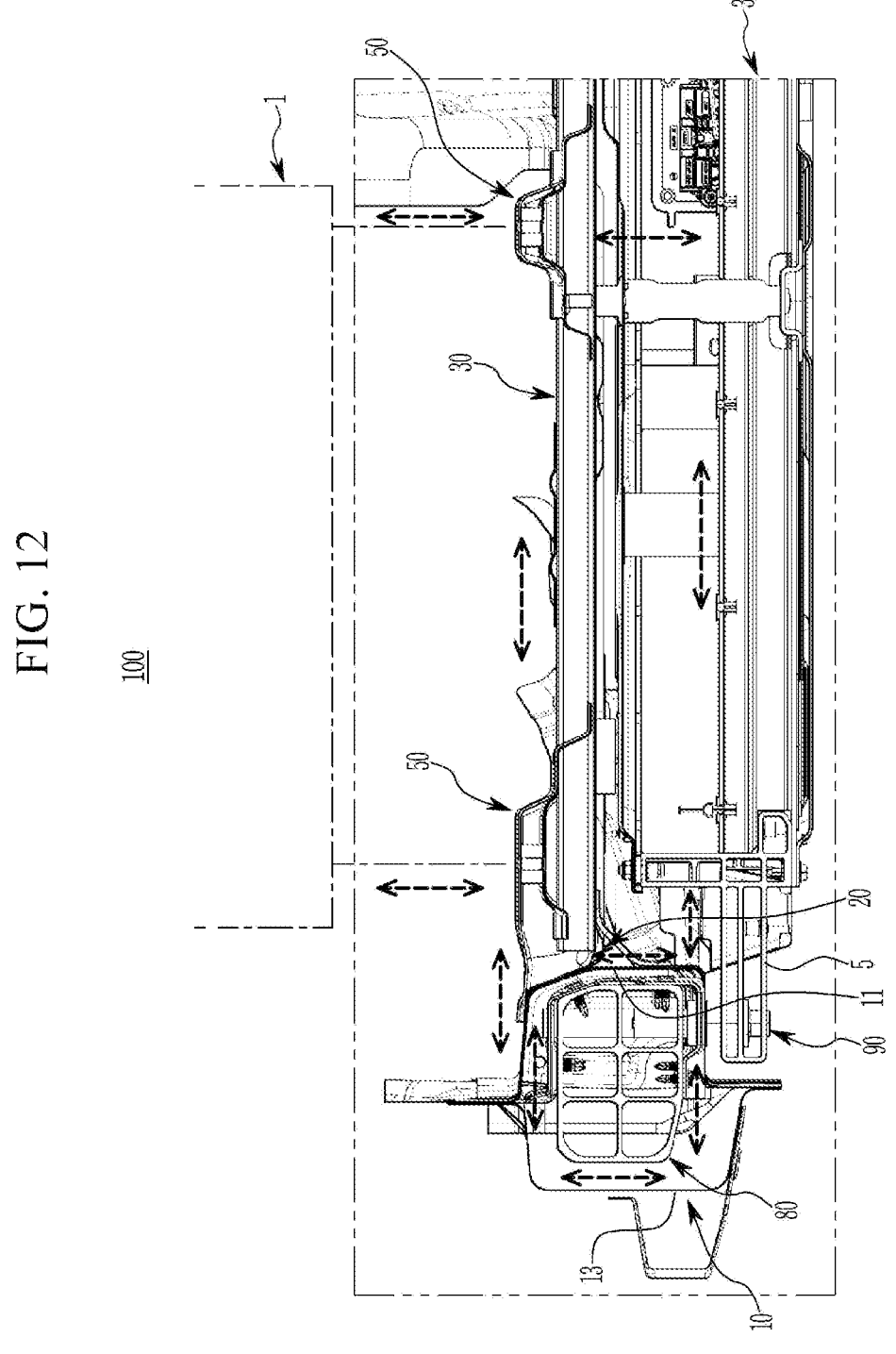
FIG. 12 is a drawing for explaining the operation of the floor structure for an electric vehicle according to an exemplary embodiment of the present invention.

Referring to FIG. 1 and FIG. 6B, in an exemplary embodiment of the present invention, the at least one seat cross member 30 mounts the at least one seat 1 on the upper portion of the floor panel 20 (see FIG. 12).

In addition, the at least one seat cross member 30 supports the at least one seat 1 and the battery assembly 3 and is configured to reduce vibration of the at least one seat 1 through the floor panel 20.

In one example, the at least one seat cross member 30 may be provided as a pair.

Each of a pair of seat cross members 30 may be disposed to the front and rear of the floor panel 20.

Such at least one seat cross member 30 is connected to the upper surface of the floor panel 20 along the vehicle width direction.

The at least one seat cross member 30 may be connected to each side sill 10 through the floor panel 20.

The at least one seat cross member 30 may also play a role of suppressing deformation along the vertical direction of the floor panel 20 and each side sill 10.

The at least one seat cross member 30 includes a connection portion 31 and at least one forming portion 33.

The connection portion 31 is formed on both sides of the vehicle body in the front-to-rear direction and is connected (e.g., welded) to the upper surface of the floor panel 20.

The at least one forming portion 33 is configured to reinforce the strength of the seat cross member 30.

The at least one forming portion 33 is formed between each connection portion 31.

In one example, the at least one forming portion 33 is provided as a pair along the front-to-rear direction of the vehicle body and is formed in a shape convexly formed upward.

A recess portion 35 is formed between the pair of forming portions 33.

In an exemplary embodiment of the present invention, the plurality of seat mounting units 50 are configured to mount (e.g., engage) at least one seat 1 to at least one seat cross member 30.

Furthermore, the plurality of seat mounting units 50 according to an exemplary embodiment of the present invention mount (e.g., engage) the battery assembly 3 disposed under the floor panel 20 to at least one seat cross member 30.

A plurality of seat mounting units 50 are installed on at least one seat cross member 30.

Figure 7:
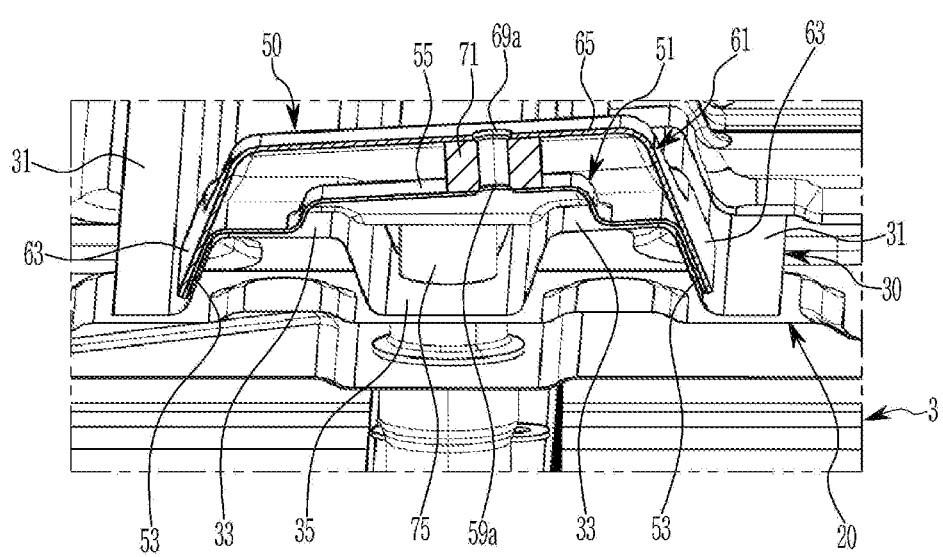
FIG. 7 is a cross-sectional view along line B-B in FIG. 3.
Figure 8:
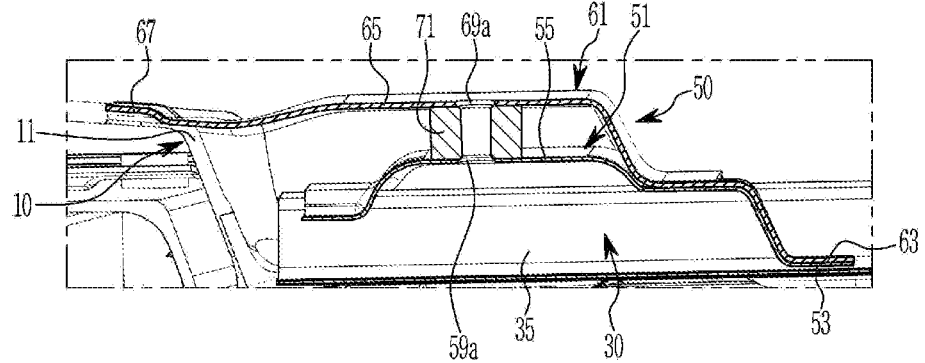
FIG. 8 is a cross-sectional view along line C-C in FIG. 3.
Figure 9:
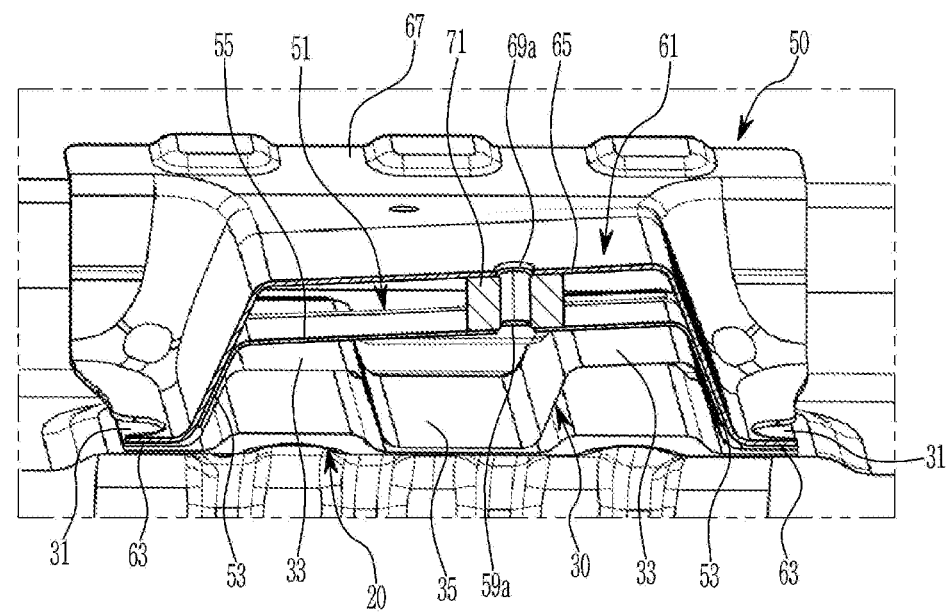
FIG. 9 is a cross-sectional view along line D-D in FIG. 3.

FIG. 7 is a cross-sectional view along line B-B in FIG. 3, FIG. 8 is a cross-sectional view along line C-C in FIG. 3, and FIG. 9 is a cross-sectional view along line D-D in FIG. 3.

Figure 10:
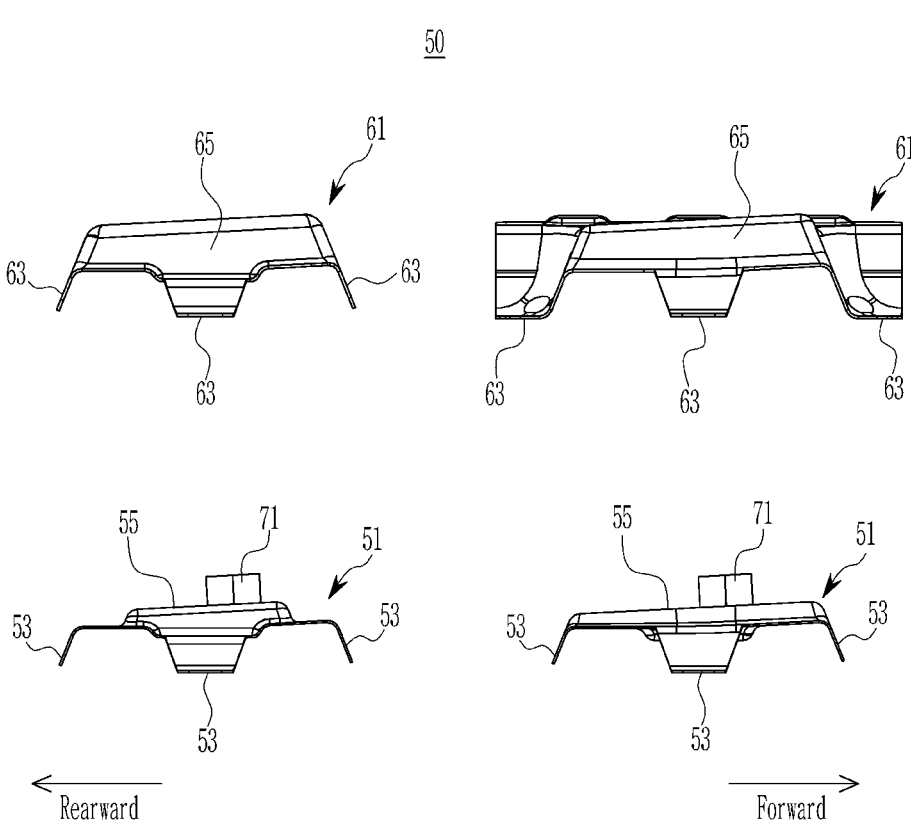
FIG. 10 is a side view showing a lower mounting bracket and an upper mounting bracket of a seat mounting unit applied to a floor structure for an electric vehicle according to an exemplary embodiment of the present invention.

FIG. 10 is a side view showing a lower mounting bracket and an upper mounting bracket of a seat mounting unit applied to a floor structure for an electric vehicle according to an exemplary embodiment of the present invention.

Referring to FIG. 1 to FIG. 10, at least one seat mounting unit 50 among the plurality of seat mounting units 50, in one example, may be mounted to a front portion of the vehicle body by at least one seat cross member 30.

Here, the at least one seat mounting unit 50 may be installed in a position corresponding to at least one seat 1 in the seat cross member 30 disposed in the front part of the vehicle body.

The at least one seat mounting unit 50 may be disposed on the center part of the seat cross member 30 disposed in the front part of the vehicle body and on the side sill 10 side.

The at least one seat mounting unit 50 may include a lower mounting bracket 51, an upper mounting bracket 61, a seat mounting pipe nut 71, and a battery mounting pipe nut 75.

In an exemplary embodiment of the present invention, the lower mounting bracket 51 is connected to the upper portion of at least one seat cross member 30.

The lower mounting bracket 51 includes a plurality of first joint flange portions 53 and a first protrude portion 55.

The plurality of first joint flange portions 53 are formed on the edge portion of the lower mounting bracket 51.

The plurality of first joint flange portions 53 are connected (e.g., welded) to the upper surface of at least one seat cross member 30.

Here, the plurality of first joint flange portions 53 may be connected to the at least one forming portion 33 and the recess portion 35 on an upper surface of at least one seat cross member 30.

And, the first protrude portion 55 is configured to reinforce the strength of the lower mounting bracket 51.

In addition, the first protrude portion 55 is configured to secure a supporting force and a load transmission path along the vertical direction of the at least one seat 1 and the battery assembly 3.

The first protrude portion 55 as shown in FIG. 10 extends from the upper surface of the lower mounting bracket 51 to the upper side and is disposed along the front-to-rear direction of the vehicle body.

The first protrude portion 55 may be formed in a shape in which the height of an upper end gradually increases from the rear part to the front part of the vehicle body.

In an exemplary embodiment of the present invention, the upper mounting bracket 61 is connected to the upper portion (e.g., upper surface) of the lower mounting bracket 51.

This upper mounting bracket 61 includes a plurality of second joint flange portions 63 and a second protrude portion 65.

The plurality of second joint flange portions 63 are formed on the edge portion of the upper mounting bracket 61.

The plurality of second joint flange portions 63 may be connected (e.g., welded) to an upper surface of the plurality of first joint flange portions 53 of the lower mounting bracket 51.

Here, at least one second joint flange portion 63 of the plurality of second joint flange portions 63 may be connected to the upper surface of the connection portion 31 of the at least one seat cross member 30.

And the second protrude portion 65 is configured to reinforce the strength of the upper mounting bracket 61.

In addition, the second protrude portion 65 is configured to secure a supporting force and a load transmission path along the vertical direction of the at least one seat 1 and the battery assembly 3.

The second protrude portion 65, as shown in FIG. 10, at a position corresponding to the first protrude portion 55 of the lower mounting bracket 51, extends upward from the upper surface of the upper mounting bracket 61 and is disposed along the front-to-rear direction of the vehicle body.

The second protrude portion 65 is formed in a shape in which the height of the upper end gradually increases from the rear part to the front part of the vehicle body.

The upper mounting bracket 61 further includes at least one third joint flange portion 67 connected to the sill inner member 11 of each side sill 10.

The at least one third joint flange portion 67 is configured to connect at least one seat cross member 30 and the sill inner member 11.

The at least one third joint flange portion 67 may be connected (e.g., welded) to the side and upper surfaces of the sill inner member 11.

In an exemplary embodiment of the present invention, the seat mounting pipe nut 71 is adapted to engage (e.g., mount) at least one seat 1 to the lower mounting bracket 51 and the upper mounting bracket 61.

The seat mounting pipe nut 71 is disposed between the lower mounting bracket 51 and the upper mounting bracket 61 and may be bonded to the lower mounting bracket 51 and the upper mounting bracket 61.

Here, the seat mounting pipe nut 71 may be connected (e.g., welded) to the upper surface of the lower mounting bracket 51 through the lower end.

And the seat mounting pipe nut 71 may be connected (e.g., welded) to the lower surface of the upper mounting bracket 61 through the upper end.

The upper end of the seat mounting pipe nut 71 may be glued to the lower side of the upper mounting bracket 61 with a structural adhesive known to a person of ordinary skill in the art.

The seat mounting pipe nut 71 is connected to first engage holes 59a and 69a formed in the first protrude portion 55 of the lower mounting bracket 51 and the second protrude portion 65 of the upper mounting bracket 61, respectively.

The seat engage bolt 73 is engaged to the seat mounting pipe nut 71 through the first engage holes 59a and 69a along the vertical direction.

The seat engage bolt 73 is connected in a downward direction to the lower portion of at least one seat 1 and may be engaged with the seat mounting pipe nut 71.

In an exemplary embodiment of the present invention, the battery mounting pipe nut 75 is configured to engage (e.g., mount) the battery assembly 3 disposed on the lower part of the floor panel 20 to the lower mounting bracket 51 and the upper mounting bracket 61.

The battery mounting pipe nut 75 may be welded to the lower surface of the lower mounting bracket 51.

Here, the battery mounting pipe nut 75 may be disposed at a lower position than the seat mounting pipe nut 71.

That is, the seat mounting pipe nut 71 may be disposed on the upper side of the battery mounting pipe nut 75.

And the battery mounting pipe nut 75 is connected to second engage holes 59b and 69b respectively formed in the lower mounting bracket 51 and the upper mounting bracket 61 (see FIG. 6A).

A battery engage bolt 77 is engaged to the battery mounting pipe nut 75 through the second engage holes 59b and 69b along the vertical direction.

The battery engage bolt 77 is connected to the upper part of the battery assembly 3 in an upper direction and may be engaged to the battery mounting pipe nut 75 by penetrating the penetration hole 39 formed in the at least one seat cross member 30 in an upper direction.

Figure 11:
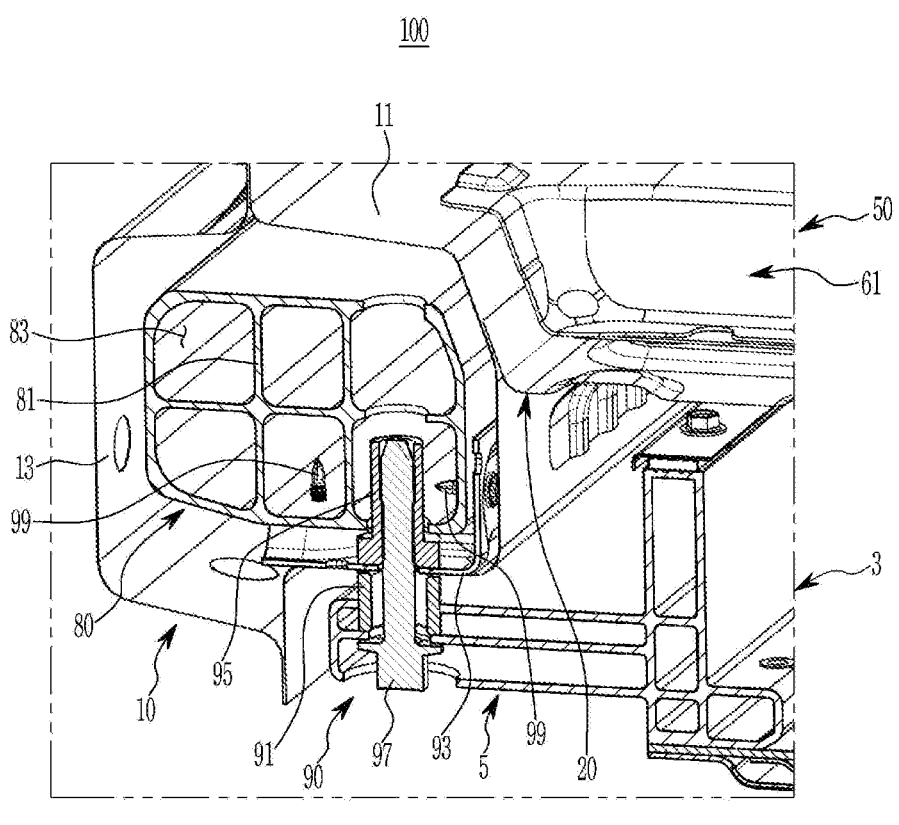
FIG. 11 is a drawing showing a connection structure of a battery assembly applied to a floor structure for an electric vehicle according to an exemplary embodiment of the present invention.

FIG. 11 is a drawing showing a connection structure of a battery assembly applied to a floor structure for an electric vehicle according to an exemplary embodiment of the present invention.

Referring to FIG. 1i, the floor structure 100 for an electric vehicle according to an exemplary embodiment of the present invention further includes a reinforcement member 80.

In an exemplary embodiment of the present invention, the reinforcement member is configured to reinforce the strength of each side sill 10.

Furthermore, the reinforcing member 80 is configured to support a crash load and protect a passenger room of the vehicle in the event of a side collision of the electric vehicle.

The reinforcement member 80 is disposed in the inner space of each side sill 10 along the front-to-rear direction of the vehicle body.

Here, the reinforcement member 80 may be provided with an aluminum extruded material known to a person of ordinary skill in the art.

In one example, the reinforcement member 80 may have a rectangular cross-section shape.

The reinforcement member 80 may include a plurality of closed sections 83 partitioned by at least one partition 81.

Each of the plurality of closed sections 83 may be formed along the front-to-rear direction of the vehicle body by at least one partition 81 disposed along the front-to-rear direction of the vehicle body.

In the floor structure 100 for an electric vehicle according to an exemplary embodiment of the present invention, the battery assembly 3 may be connected to each side sill 10 through side flange portions 5 provided on both sides along the vehicle width direction.

The side flange portion 5 of the battery assembly 3 may be connected (e.g., mounted) to the lower portions of the reinforcement member 80 and the sill inner members 11 through a battery mounting unit 90.

In an exemplary embodiment of the present invention, the battery mounting unit 90 may include a bolt support member 91, a support bracket 93, a nut member 95, and a mounting bolt 97.

The bolt support member 91 is a portion through which the mounting bolt 97 passes and is formed along the vertical direction on the side flange portion 5 of the battery assembly 3.

The support bracket 93 is connected to the inner surface of the lower part of the sill inner member 11 and is engaged to the reinforcement member 80.

The support bracket 93 may be engaged to the reinforcement member 80 through a plurality of screws 99.

The plurality of screws 99 may be flow drill screws (FDS) known to those skilled in the art.

The nut member 95 is secured (e.g., bonded or welded) to the support bracket 93 along an upward and downward direction and is engaged to the reinforcement member 80.

The nut member 95 is connected with the bolt support member 91 through a hole formed in the lower portion of the sill inner member 11.

Then, the mounting bolt 97 is passed through the bolt support member 91 and secured to the nut member 95.

The mounting bolt 97 supports the bolt support member 91 through its head and may be fastened to the nut member 95.

FIG. 12 is a drawing for explaining the operation of the floor structure for an electric vehicle according to an exemplary embodiment of the present invention.

Hereinafter, the operation of the floor structure 100 for the electric vehicle according to an exemplary embodiment of the present invention, which is configured as described above, will be described in detail with reference to FIG. 1 to FIG. 12.

In an embodiment of the present invention, the at least one seat cross member 30 is connected to the upper surface of the floor panel 20.

And a plurality of seat mounting units 50 are installed on the at least one seat cross member 30.

Here, at least one seat mounting unit 50 of the plurality of seat mounting units 50 includes the lower mounting bracket 51 and the upper mounting bracket 61 in the basically double bracket structure.

The lower mounting bracket 51 is connected to the upper portion of the at least one seat cross member 30, and the upper mounting bracket 61 is connected to the upper portion of the lower mounting bracket 51.

The upper mounting bracket 61 may be connected to the sill inner member 11.

Further, the seat mounting pipe nut 71 is mounted between the lower mounting bracket 51 and the upper mounting bracket 61.

The battery mounting pipe nut 75 is connected to the lower portion of the lower mounting bracket 51.

Thus, the at least one seat 1 may be fastened to the seat mounting pipe nut 71 via the seat engage bolt 73.

And the battery assembly 3 may be secured to the battery mounting pipe nut 75 via the battery engage bolt 77.

According to the floor structure 100 for the electric vehicle according to an exemplary embodiment of the present invention as described so far, the mounting portion of the at least one seat 1 and the mounting portion of the battery assembly 3 may be connected to each other via the at least one seat mounting unit 50.

As a result, the floor structure 100 for the electric vehicle according to exemplary embodiments of the present invention may improve the connectivity between the mounting portion of the at least one seat 1 and the mounting portion of the battery assembly 3.

The floor structure 100 for the electric vehicle according to an exemplary embodiment of the present invention may improve the connectivity of the at least one seat cross member 30, the sill inner member 11, and the reinforcement member 80 via the at least one seat mounting unit 50 and the battery mounting unit 90.

Thus, the floor structure 100 for the electric vehicle according to an embodiment of the present invention may form a load path connecting the at least one seat 1, the battery assembly 3, the at least one seat cross member 30, the sill inner member 11, and the reinforcement member 80 (see FIG. 12).

That is, the mounting portion of the at least one seat 1, the mounting portion of the battery assembly 3, the at least one seat cross member 30, the sill inner member 11, and the reinforcement member 80 may be connected to each other, rather than disconnected from each other.

Thus, the floor structure 100 for the electric vehicle according to an exemplary embodiment of the present invention may secure a robust connection force of the at least one seat 1 and may smoothly transfer and distribute the load input to the at least one seat 1.

Accordingly, the floor structure 100 for the electric vehicle according to an exemplary embodiment of the present invention may increase the input point stiffness of the at least one seat 1, thereby minimizing the occurrence of vibration of the at least one seat 1 through the floor panel 20 during driving of the electric vehicle.

In addition, the floor structure 100 for the electric vehicle according to an exemplary embodiment of the present invention may secure the strength (e.g., bending strength) of the vehicle body, may improve the ride comfort of the electric vehicle, and may prevent rotation of each side sill 10 in the event of a side collision of the electric vehicle.

Thus, the floor structure 100 for the electric vehicle according to an exemplary embodiment of the present invention may minimize deformation of the vehicle body in a side collision of the vehicle and may improve the crash safety performance of the electric vehicle by securing a survival space for an occupant.

And the floor structure 100 for the electric vehicle according to an embodiment of the present invention may have a flat-type floor panel 20 with a reduced cross-sectional height by a connection structure of the at least one seat cross member 30 and the reinforcing member 80.

Thus, the floor structure 100 for the electric vehicle according to an exemplary embodiment of the present invention may mount the battery assembly 3 with increased capacity on the lower part of the floor panel 20.

Furthermore, according to the floor structure 100 for the electric vehicle according to an exemplary embodiment of the present invention, the battery assembly 3 is connected to each of the side sills 10 and the reinforcement member 80 via the battery mounting unit 90.

Thus, the floor structure 100 for the electric vehicle according to an exemplary embodiment of the present invention may minimize damage to the battery assembly 3 in a side collision of the electric vehicle by securing the bonding strength of the battery assembly 3.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A floor structure for an electric vehicle, the floor structure comprising:
    a floor panel configured to be connected to side sills disposed on opposing sides of the vehicle in a width direction and extending along front and rear directions of a body of the vehicle;
    a cross member connected to an upper portion of the floor panel along the width direction of the vehicle; and
    a seat mounting unit installed on the cross member, wherein the seat mounting unit comprises a lower mounting bracket connected to an upper portion of the cross member, an upper mounting bracket connected to an upper portion of the lower mounting bracket, and a battery mounting pipe nut connected to a lower surface of the lower mounting bracket, wherein the battery mounting pipe nut is configured to mount a battery assembly on a lower part of the floor panel.

2. The floor structure of claim 1, wherein the seat mounting unit further comprises a seat mounting pipe nut disposed between the lower mounting bracket and the upper mounting bracket, and wherein the seat mounting pipe nut is connected to the lower mounting bracket and the upper mounting bracket.

3. The floor structure of claim 2, wherein the seat mounting pipe nut is disposed on an upper side of the battery mounting pipe nut.

4. The floor structure of claim 1, wherein the battery mounting pipe nut is connected to second engage holes provided in the lower mounting bracket and the upper mounting bracket, respectively.

5. The floor structure of claim 4, further comprising a battery engage bolt engaged to the battery mounting pipe nut through the second engage holes.

6. The floor structure of claim 2, wherein:
    the seat mounting pipe nut is connected to an upper surface of the lower mounting bracket and to a lower surface of the upper mounting bracket; and
    the seat mounting pipe nut is connected to first engage holes provided in the lower mounting bracket and the upper mounting bracket, respectively.

7. The floor structure of claim 6, further comprising a seat engage bolt engaged to the seat mounting pipe nut through the first engage holes.

8. The floor structure of claim 1, wherein the lower mounting bracket comprises:
    a plurality of first joint flanges provided on an edge portion to be connected to an upper surface of the cross member; and
    a first protrude portion that extends upward from an upper surface of the lower mounting bracket and is disposed along a front-to-rear direction of the electric vehicle such that a height thereof gradually increases from a rear portion to a front portion of the electric vehicle.

9. The floor structure of claim 1, wherein the upper mounting bracket comprises:
    a plurality of second joint flanges provided on an edge portion to be connected to an upper surface of the lower mounting bracket and an upper surface of the cross member; and
    a second protrude portion that extends upward from an upper surface of the upper mounting bracket and is disposed along a front-to-rear direction of the electric vehicle such that a height thereof gradually increases from a rear portion to a front portion of the electric vehicle.

10. The floor structure of claim 9, wherein the upper mounting bracket further comprises a third joint flange portion connected to a sill inner member of each side sill.

11. A floor structure for an electric vehicle, the floor structure comprising:
    a cross member connected to an upper portion of a floor panel of the electric vehicle along a vehicle width direction, wherein the floor panel is configured to be connected to a pair of side sills that are disposed on each side of the electric vehicle, respectively, and extend in a front-to-rear direction of the electric vehicle;
    reinforcement members disposed inside each side sill, respectively, along the front-to-rear direction of the electric vehicle, wherein each reinforcement member comprises an aluminum extruded material; and
    a seat mounting unit installed on the cross member, wherein the seat mounting unit comprises a lower mounting bracket connected to an upper portion of the cross member, an upper mounting bracket connected to an upper portion of the lower mounting bracket, and a battery mounting pipe nut connected to a lower surface of the lower mounting bracket, wherein the battery mounting pipe nut is configured to mount a battery assembly on a lower part of the floor panel.

12. The floor structure of claim 11, further comprising a battery assembly disposed on the lower part of the floor panel and connected to lower portions of each reinforcement member and sill inner members of the side sills through a battery mounting unit.

13. The floor structure of claim 12, wherein the battery mounting unit comprises:

bolt support members provided on side flange portions provided on both sides of the battery assembly along the vehicle width direction;

support brackets connected to inner surfaces of a lower portion of the sill inner members and engaged to a lower portion of each reinforcement member;

nut members secured to the support brackets and connected to the bolt support members; and mounting bolts engaged to the nut members through the bolt support members.

14. An electric vehicle comprising:

a vehicle body comprising a pair of side sills disposed on each side of the vehicle body, respectively, and extending in a front-to-rear direction of the vehicle body;

a floor panel connected to the pair of side sills;

a cross member connected to an upper portion of the floor panel along a vehicle width direction;

a seat mounting unit installed on the cross member, wherein the seat mounting unit comprises a lower mounting bracket connected to an upper portion of the cross member, an upper mounting bracket connected to an upper portion of the lower mounting bracket, and a seat mounting pipe nut that is disposed between the lower mounting bracket and the upper mounting bracket, wherein the seat mounting pipe nut is connected to the lower mounting bracket and the upper mounting bracket; and a battery assembly mounted on a lower part of the floor panel.

15. The electric vehicle of claim 14, wherein the seat mounting unit further comprises:

a battery mounting pipe nut connected to a lower surface of the lower mounting bracket, wherein the battery mounting pipe nut is configured to mount the battery assembly on the lower part of the floor panel.

16. The electric vehicle of claim 15, wherein:

the seat mounting pipe nut is connected to an upper surface of the lower mounting bracket and to a lower surface of the upper mounting bracket; and the seat mounting pipe nut is connected to first engage holes provided in the lower mounting bracket and the upper mounting bracket, respectively.

17. The electric vehicle of claim 16, further comprising a seat engage bolt engaged to the seat mounting pipe nut through the first engage holes.

18. The electric vehicle of claim 14, wherein the lower mounting bracket comprises:

a plurality of first joint flanges provided on an edge portion connected to an upper surface of the cross member; and a first protrude portion that extends upward from an upper surface of the lower mounting bracket and is disposed along the front-to-rear direction of the vehicle body such that a height thereof gradually increases from a rear portion to a front portion of the electric vehicle.

19. The electric vehicle of claim 14, wherein the upper mounting bracket comprises:

a plurality of second joint flanges provided on an edge portion connected to an upper surface of the lower mounting bracket and an upper surface of the cross member;

a second protrude portion that extends upward from an upper surface of the upper mounting bracket and is disposed along the front-to-rear direction of the vehicle body such that a height thereof gradually increases from a rear portion to a front portion of the electric vehicle; and a third joint flange portion connected to a sill inner member of each side sill.

20. The electric vehicle of claim 15, wherein the seat mounting pipe nut is disposed on an upper side of the battery mounting pipe nut.

* * * * *